E. F. RATE.
Grain Drill.

No. 38,840.

Patented June 9, 1863.

Witnesses:
Wm Kemble Wall
Clarence Delafield

Inventor:
E. F. Rate, by his attorney
Amos Broadnay
Washington D.C.

UNITED STATES PATENT OFFICE.

EDWARD F. RATE, OF WOODBRIDGE, IOWA.

IMPROVEMENT IN SEED-DRILLS.

Specification forming part of Letters Patent No. 38,840, dated June 9, 1863; antedated January 11, 1862.

*To all whom it may concern:*

Be it known that I, EDWARD F. RATE, of Woodbridge, in the county of Cedar and State of Iowa, have invented a new and useful Improvement in Seed or Wheat Drills; and I do hereby declare that the following is a full, clear, and exact description of the same, reference being had to the annexed drawings, making a part of this specification, and to the letters of reference marked thereon.

The chief object of this invention is to break any old cornstalks and similar obstructions that may be in the way of the drills and impede the action of a drilling-machine; and this object is attained by a series of toothed or spurred wheels that roll on the ground and hold the stalks down while the drills break through them. In other respects my invention consists in raising the said toothed wheels and the drills from the ground, and in shutting off the seed by simply raising a handle.

To enable others skilled in the art to make and use my invention, I will proceed to describe its construction and operation.

Figure 1:
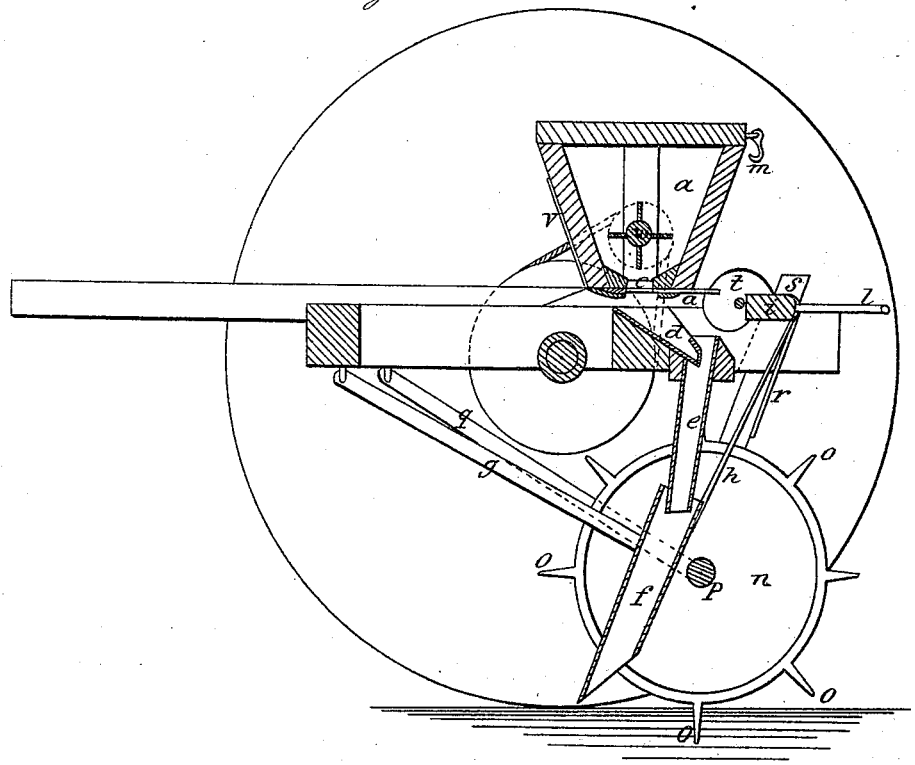
Figure 2:
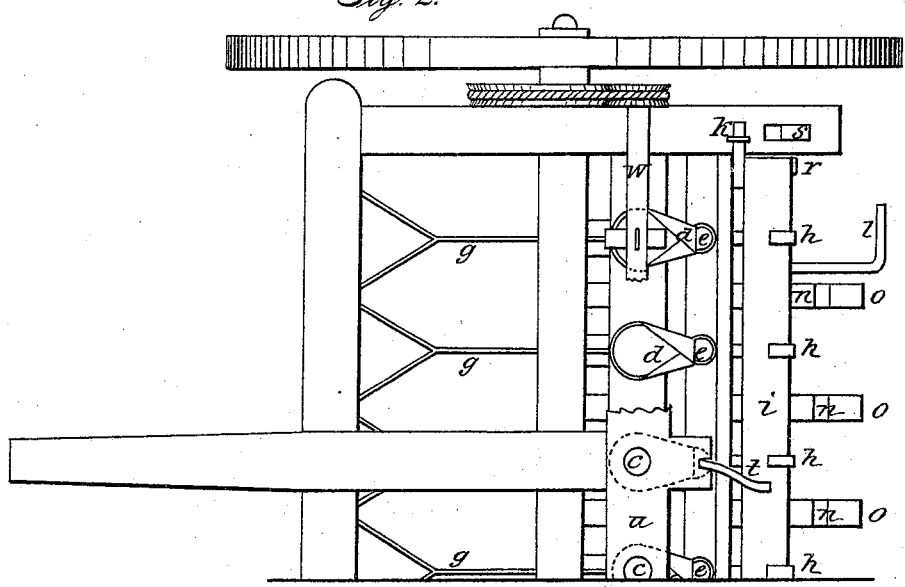

Figure 1 of the drawings is a sectional elevation of my improved seed-drill, and Fig. 2 is a plan of the same with the hopper removed.

The seed to be sown is placed in the hopper $a$, in the bottom of which are openings $c$, through which the seed is delivered to chutes $d$, that conduct it to the tubes $e$, down which and the movable drills $f$ it falls to the ground. The movable drills are secured to the ends of levers $g$, that are jointed to the front beam of the frame of the machine, and they are supported by straps $h$, that are fastened to the beam $i$, which turns on the joints $k$ on each side of the frame. By turning up the handle $l$ of the beam $i$ and securing it with the hook $m$ on the side of the seed-hopper the drills $f$ are swung up on their jointed levers and held above the ground. The jointed ends of the levers are divided and spread open to occasion only a vertical movement of the drills.

The rollers $n$ are provided with teeth or spurs $o$, and are placed on a shaft, $p$, between the drills. The shaft $p$ is hung at the ends of levers $q$, that are jointed under the side pieces of the frame at the forward part of the machine; and it s also hung by straps $r$ to the beam $i$, and is furnished with guides $s$, that pass through mortises in the ends of the sides of the frame. As the beam $i$ therefore is turned up on its hinges to lift the drills, the shaft $p$ and its rollers $n$ are also lifted from the ground, and at the same time the cam $t$, that is secured to the beam $i$, shifts the seed-slide $u$ and closes the seed-openings in the hopper.

Attached to the seed-slide, and passing up in front of the hopper, is an index, $v$, that indicates on the outside the opening of the seed-slides. Inside the seed-hopper is the shaft $w$, that is provided with stirring-vanes over each opening, and is mounted in slides at the ends of the hopper. It is rotated by a band and pulley from the axle of the machine.

The frame of the machine and the various parts may be made in different ways without departing from the spirit of my invention; but I prefer the arrangement shown on the drawings.

Previous to operating with this machine over fields encumbered with old cornstalks the ground should be rolled. When the machine is in use the teeth $o$ of the wheels $n$ catch the cornstalks and hold them to the ground, while the advancing drills break through them without becoming entangled. After the drills have passed the wheels roll over them and leave them on the ground. By lifting the handle $l$ and turning the beam $i$ up on its edge, the drills and toothed wheels are lifted from the ground and the seed-openings are closed by the cam $t$ shifting the seed-slide. The rotation of the shaft $w$ prevents the clogging of the seed in the hopper.

I claim as my invention and desire to secure by Letters Patent—

1. Constructing a seed-drill with the toothed wheels $n$, operating in the manner described, and for the purpose specified.

2. Combining the toothed wheels $n$, drills $f$, cam $t$, and guides $s$, substantially in the manner described, by which the wheels and the drills may be raised from the ground and the seed cut off by a single shifting of the handle.

EDWARD F. RATE.

Witnesses:
   C. E. GRAY,
   WM. C. MAYHEW.